May 9, 1950
C. K. HUTHSING
2,506,872
VALVE MECHANISM
Filed June 19, 1945
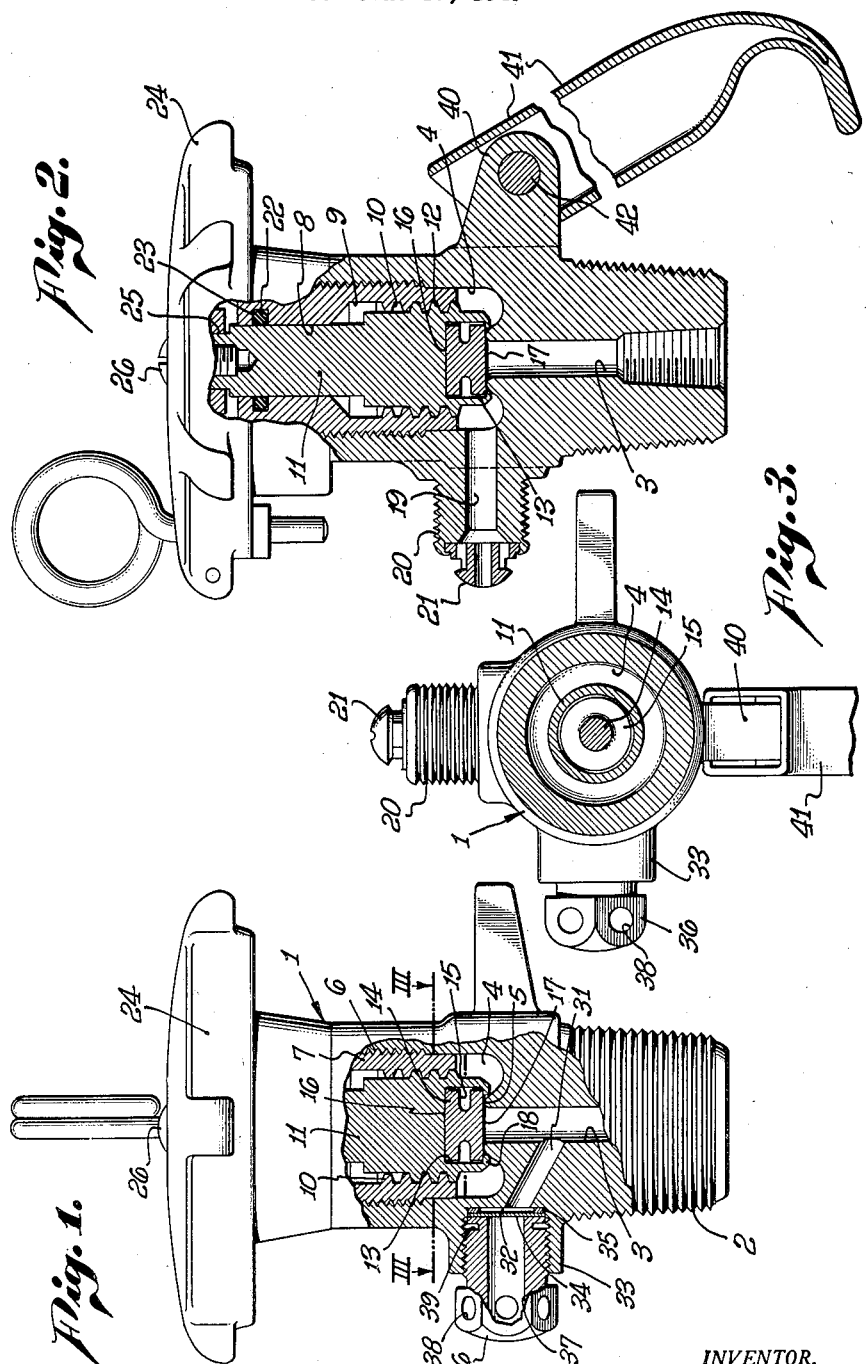
INVENTOR.
CHARLES K. HUTHSING,
BY
Harred E. Mattingly
ATTORNEY.

Patented May 9, 1950

2,506,872

UNITED STATES PATENT OFFICE 2,506,872

VALVE MECHANISM

Charles K. Huthsing, Beverly Hills, Calif.

Application June 19, 1945, Serial No. 600,306

2 Claims. (Cl. 251—27)

My invention relates to valves and has particular reference to a valve mechanism especially adapted for use with high pressure containers such as carbon dioxide fire extinguishers and the like.

In control valves for handling relatively high pressures, such as those which are employed in carbon dioxide fire extinguishers wherein the valve must control the flow of carbon dioxide from a tank containing carbon dioxide in liquid form, considerable difficulty has been encountered in providing a valve which will tightly seal against leakage of the high pressure gases past the valve unless great care is exerted in machining the valve seat and the movable valve members which seat thereon, any misalignment resulting in a cocking of the valve member upon its seat, with the resultant failure of seal.

Another problem which has presented itself in connection with valves of the character described has been that of providing a safety seal adapted to blow out and relieve pressures in the tank should such pressures build up to such extent as to render them dangerous to the tank and valve structures.

It is, therefore, an object of my invention to provide a valve structure which may be employed for any valve use, in which the valve seats with substantially uniform pressure over the entire valve seat by automatically assuming a position at right angles to the axis thereof; i. e. with the valve face and valve seat in parallel planes, thereby compensating for minor inaccuracies in the forming or machining of the seating surfaces.

Another object of my invention is to provide a valve structure wherein the sealing member of the movable valve member may be formed of fiber, plastic or other similar material and in which the forces exerted upon the sealing member are exerted through a self-aligning element adapted to flex in the event the valve seat and the sealing member engage each other in planes other than parallel planes.

Another object of my invention is to provide a valve structure of the character herein set forth wherein the valve body is provided with a safety outlet adapted to be sealed by a rupturable diaphragm held by means of a plug having a self-aligning portion upon that end of the plug which engages and holds the diaphragm in place.

Other objects and advantages of my invention will be apparent from a study of the following specifications, read in connection with the accompanying drawings, wherein:

Fig. 1 is a view partly in vertical section and partly in elevation taken through the improved valve;

Fig. 2 is an enlarged detail view illustrating the manner in which the valve parts operate when there is misalignment between the rotational axis of the movable valve member and the seating surface against which it is to close;

Fig. 3 is a sectional view taken on the line III—III of Fig. 1.

Referring to the drawing, I have illustrated my valve construction as embodied in a valve assembly particularly adapted for use with a carbon dioxide fire extinguisher of the type in which the valve assembly is to be connected to the top of a tank of carbon dioxide (not shown) as by providing a valve body 1 with a threaded male coupling member 2 adapted to be threaded into the top of the tank.

The valve body 1 has a flow passage 3 extending from the lower end thereof into a valve chamber 4, the junction between the flow passage 3 and the valve chamber 4 being formed by a valve seat 5 which preferably projects slightly into the valve chamber 4, as shown particularly in Figs. 1 and 2. The valve seat 5 is preferably machined so as to provide a valve seating surface disposed in a plane transverse to the longitudinal axis of the passage 3.

The valve chamber 4 is formed as by boring the upper end of the valve body 1, threading a portion of such bore as indicated at 6 for the reception therein of a bushing 7 which in turn has a cylindrical bore 8 formed therein, the lower portion of which is enlarged as indicated at 9 and internally threaded with a relatively high pitch thread, as indicated at 10. In the bushing bore is mounted a movable valve operating member or stem 11, the upper end of which is cylindrical to fit into the bore 8 while the lower end is slightly enlarged and provided with threads 12 which engage the high pitch threads 10 of the bushing 7 so that a relatively small rotary movement of the movable valve member 11 will cause it to move through a considerable vertical distance relative to the valve seat 5.

The seal between the movable valve member 11 and the valve seat 5 is preferably formed as by counterboring the lower end of the movable valve member 11, as indicated at 13, and inserting in this counterbore a yielding plug element 14, this plug element being preferably constructed as a cylindrical piece of metal having considerable resiliency, the plug element 14 having formed therein an annular radially extending groove 15 which will permit the relative tilting of the upper surface 16 and the lower surface 17 of the plug element. By providing this structure, it will be apparent that in the event that there is any misalignment between the movable member 11 and the valve seat 5, that is, particularly if there is any angular relation between the plane of the base of the counterbore 13 and the plane of the valve seat 5, as illustrated particularly in Fig. 2, such angularity will be compensated for by a flexing or yielding of the upper and lower portions of the plug 14 relative to each other permitted by the groove 15.

As shown in Fig. 2, such yielding permits the lower surface 17 of the plug 14 to assume a position in a plane parallel to the actual plane of the seat 5, one side of the plug 14 being pressed upwardly away from the rolled over edge 18 of the lower end of the movable valve member 11 which normally holds the plug 14 in place.

Thus this construction permits the ready manufacture of the valve body, the seat 5, the bore 6, the bushing 7 and the bore 8 with relatively great tolerances, any deviation from exactness of construction being compensated for by the yielding character of the forces which will be exerted on the plug 14 to cause it to seat snugly against its seat 5.

While the foregoing construction of valve body, bushing, seat and movable valve member may be employed for valve constructions for any desired purpose, it will be apparent that the structure is particularly adapted for the control of fluids under high pressure since an accurate fluid-tight seal can be made between the movable valve member 11 and its seat 5. The particular valve body 1 illustrated, being that adapted for use with a carbon dioxide fire extinguisher, I prefer to provide the outlet passage 19 which communicates with the valve chamber 4 as extending radially from the valve chamber through a radially projecting boss 20 to which may be secured any suitable nozzle or hose 21 for the distribution of the carbon dioxide gases.

The movable valve member 11 is preferably sealed as by means of a doughnut ring seal 22 disposed in an annular groove 23 formed in the bushing 7.

The movable valve member 11 may be rotated in any suitable manner as by means of a handle or handwheel 24 which seats upon a squared section 25 formed upon the extreme upper end of the valve member 11 and to which it may be secured by means of a screw 26.

To provide in the valve structure a safety valve, I prefer to form an auxiliary passageway 31 (see Fig. 1) which communicates with the inlet passage 3 and with a safety valve chamber 32 which may be formed in a radially extending boss 33 comprising a part of the valve body 1. The safety valve chamber 32 is adapted to receive a safety valve in the form of a diaphragm 34 which may be constructed of suitable frangible or rupturable material, such as relatively thin metal which will rupture when exposed to a predetermined number of pounds of pressure over a given area of the surface of the diaphragm material. The diaphragm 34 may be readily assembled in place as by placing it in the safety valve chamber 32 where it will abut the inner surface of the bore comprising the valve chamber 32, though I prefer to interpose therebetween a gasket 35. The diaphragm is held in place and sealed therein by means of a plug 36 threaded into the safety valve chamber bore and having its inner end engaging and bearing upon the diaphragm 34. A counterbore 37 extends from the inner end of the plug 36 and into communication with a plurality of radially extending apertures 38 formed in the outer end of the plug 36.

Thus when the exposed portion of the diaphragm 34 (the area exposed by the counterbore 37) is subjected to pressure sufficient to rupture the same, the contents of the tank or other device with which my valve may be associated will be permitted to exhaust through the safety valve plug 36.

To insure the sealing of the diaphragm 34, in the event there are inaccuracies in the machining of the safety valve chamber 32 and the end of the plug 36, I provide a radial groove 39 extending about the plug 36 adjacent its inner end, the effect of which will be to sufficiently weaken the metal of the plug as to permit its slight bending or distortion to accurately align the end of the plug and the diaphragm in parallel planes. The effect of this is to provide a yielding seal between the plug, the diaphragm and the base of the safety valve chamber bore 32.

If desired, a carrying handle for the fire extinguisher, or other tank to which my valve may be attached, may be readily provided by means of forming an outwardly extending ear 40 to which may be attached a carrying handle of any suitable shape 41, preferably secured to the ear by means of a pivot pin 42.

From the foregoing it will be apparent that I have provided a valve structure in which the valve body and movable valve member may be manufactured by mass production methods, without requiring great accuracy or precision of machining, the inaccuracies within reasonable limits between the plane of the seating surface of the movable valve member and the plane of the seat with which it is to seal being absorbed by the provision of the yielding plug structure 14. Similarly, reasonable inaccuracies in the machining of the safety valve chamber and the safety valve plug are absorbed by providing the yielding end upon the plug.

It will also be noted that I have provided a relatively simple and inexpensive valve structure particularly adapted for carbon dioxide fire extinguishers, in which in a single unit is incorporated the valve for controlling the flow of fluid from the extinguisher, a nozzle structure comprising a unitary part of the valve assembly and a safety valve incorporated as a unitary part of the valve structure.

While I have shown and described the preferred embodiment of my invention, I do not desire to be limited to any of the details of construction shown and described herein, except as defined in the appended claims.

I claim:

1. In a high pressure valve construction: a valve body having a passageway therein terminating in an annular valve seat, a movable valve operating member in axial alignment with said passageway and having a recess in the end thereof adjacent said seat, means guiding said valve operating member in its movement toward and away from said seat, and an annular valve member disposed in said recess having an imperforate substantially flat face for closing on said seat, said valve member having an outwardly opening annular groove about the periphery thereof in axially spaced relation from the seating face of said valve member for weakening the supporting structure of the valve face said groove dividing the valve member into flexibly connected portions, each of which is angularly flexible relative to the other, whereby the valve face, when forced against said seat, will bear with substantially equal pressure at all points and thereby compensate for inaccuracies in parallelism of the planes of said valve seat and valve face and misalignment between said operating member and said guiding means.

2. In a high pressure valve construction, a valve body having a passageway therein terminating in an annular valve seat, a valve operating member movable toward and away from said seat and disposed in axial alignment with said passageway, an annular valve seating member interposed between said valve seat and said operating member and having an imperforate substantially flat face for closing on said seat, means guiding said operating member in its movement toward and away from said seat including thread means respectively on said guiding means and said operating member, said annular valve seating member having an inwardly extending annular groove about the periphery thereof axially spaced from said flat face, the inner terminal ends of said groove defining a weakened portion in said valve seating member, and dividing the valve seating member into flexibly connected portions each of which is angularly flexible relative to the other so that upon application of pressure to the flat face of the valve seating member, the same will bear with substantially equal pressure at all points on its surface contacting with the valve seat and thereby compensate for inaccuracies in parallelism of the planes of said valve seat and the valve face and also compensate for misalignment between said valve operating member and said guiding means.

CHARLES K. HUTHSING.

REFERENCES CITED

The following references are of record in the file of this patent:

UNITED STATES PATENTS

| Number | Name | Date |
| --- | --- | --- |
| 583,467 | Griffiths | June 1, 1897 |
| 964,468 | Guss | July 12, 1910 |
| 1,609,340 | Wilson | Dec. 7, 1926 |
| 1,934,314 | Lawler | Nov. 7, 1933 |
| 1,975,178 | Smith | Oct. 2, 1934 |
| 2,047,750 | Smith | July 14, 1936 |
| 2,239,169 | Franck | Apr. 22, 1941 |

FOREIGN PATENTS

| Number | Country | Date |
| --- | --- | --- |
| 786,524 | France | of 1935 |